United States Patent [19]

Bucek et al.

[11] Patent Number: 4,500,928

[45] Date of Patent: Feb. 19, 1985

[54] STORAGE APPARATUS FOR VIDEO DATA

[75] Inventors: Francis J. Bucek, Binghamton; Frank V. Paxhia, Johnson City, both of N.Y.

[73] Assignee: International Business Machines Corporation, Armonk, N.Y.

[21] Appl. No.: 444,557

[22] Filed: Nov. 26, 1982

[51] Int. Cl.³ .................... H04N 1/22; H04N 1/40
[52] U.S. Cl. .................................. 358/296; 358/280
[58] Field of Search .............. 358/256, 280, 288, 296; 346/35

[56] References Cited

U.S. PATENT DOCUMENTS

4,242,707 12/1980 Bupai ................................. 358/280

Primary Examiner—Howard W. Britton
Assistant Examiner—John K. Peng
Attorney, Agent, or Firm—John S. Gasper

[57] ABSTRACT

Apparatus for recording in memory the data of a displayed video frame by storing as data bytes all of the binary data bits from the video data signal appearing as scan lines generated in succession within groups in a frame. The capture of video data occurs within a single regeneration of the raster image. Also recorded in memory for each scan line is a status byte to designate whether the next predetermined number of scan lines are to be omitted to provide spacing between rows of displayed characters.

15 Claims, 9 Drawing Figures

STORAGE APPARATUS FOR VIDEO DATA

CROSS REFERENCE TO RELATED APPLICATION

Portions of the material herein described have been disclosed and claimed in a copending application for patent, Ser. No. 271,911, filed June 9, 1981, by L. V. Galetto et al, entitled "Video Display Recording Apparatus" and assigned to the assignee of this application.

BACKGROUND OF THE INVENTION

This invention relates generally to video display terminals and more particularly to apparatus for recording in memory for later reproduction all data displayed on the scan line raster of a predetermined video frame.

When using a video display terminal (VDT) in a computer system, a permanent record of a frame of data as displayed on the face of the cathode ray tube is often desirable. The exhibited data are in the form of binary bits controlling the unblanking of the electron beam that is being repeatedly scanned across the face of the tube. Each display frame is thus formed of a matrix of fluorescent dots with each dot representing the presence of a binary bit. Source data are generally provided from a random access memory to permit regeneration of the frame as long as required.

Hard copy printers, because of their relative slowness, require a form of buffer storage into which the binary data are read from the source and temporarily retained until the printer can complete the job much later. The frame data can be obtained either from a memory for the display device or directly from the video input to the display from a remote source.

Buffer storage arrangements for enabling printers to produce frame copy in the past have used several techniques to capture the bit data for the particular frame. One technique has been to temporarily store character codes that are transmitted from the display to a character generator; these codes also select the desired character for printing from the printer's own character generator. Another technique has been to capture the bits of only a single scan line, record them, then repeat the process for each scan line in succession to compose the frame. Yet another technique has been to capture a predetermined segment or portion of each of the scan lines and print the frame transversely of its original orientation.

This is the technique described in the aforementioned patent application Ser. No. 271,911.

The first method has the advantage of storing only character codes and tying up the display unit for the minimum time. However, not all data points on the screen are addressable since only data lines and characters within a line can be recorded. This type of recording is unable to provide copies of diagrams or charts which are frequently necessary. The second technique requires minimum buffer storage, since it stores only the bits in a single scan line, but the printer must record each line before the next line of bits can be stored. Thus the use of a display unit is delayed extensively until all lines are sequentially printed. An example of this technique is the system shown in U.S. Pat. No. 4,158,203. Further, the printing device must be equal in length to a full scan line, usually having several hundred elements. With the third alternative, as mentioned, the printed copy is usually rotated by 90 degrees, and the VDT is connected to the printer for a moderate amount of time since only the segments of each scan line are printed during a single excursion of the print head. Both of the latter techniques have the advantage of placing in buffer storage all data points addressable on the face of the VDT, thereby enabling the recording of diagrams and charts.

The foregoing types of display copying, however, each require either relatively lengthy connection time between the VDT and printer or cannot capture all data points displayed on the screen.

OBJECTS AND SUMMARY OF THE INVENTION

It is accordingly a primary object of this invention to provide digital storage apparatus for video data with which all addressable data points of a frame can be stored during a single regeneration cycle for the frame.

Another important object of this invention is to provide digital storage apparatus for capturing video data in the order in which the data are generated for display on the display terminal.

Yet another object of this invention is to provide digital storage apparatus for video data in which the odd and even scan line data are stored by groups.

A further object of this invention is to provide digital storage apparatus for video data in which a status byte of data is stored at the end of each scan line to indicate whether a succeeding scan line is to be omitted during subsequent print out.

Another object of this invention is to provide digital storage apparatus for video data in which predetermined segments of each scan line are temporarily placed in a buffer and portions thereof are stored during the capture of a succeeding segment.

The foregoing objects are attained in accordance with the invention by providing control circuit means energizable by microprocessor means for responding to the generation of vertical synchronizing signals of a video display terminal to serially capture video data as it is transmitted to the terminal, and using shift register means as buffer storage to capture predetermined segments of the scan lines in conjunction with counter means to break those segments into storable data bytes for placement in random access memory means. The control means further include means for generating supplemental cycles at the conclusion of a scan line for storing the last segment of data as a plurality of bytes in the random access storage and to accommodate a status byte indicating whether subsequent scan lines are to be omitted during printing.

The random access memory of the digital storage apparatus is sufficient to accommodate all addressable display points of the video frame and captures all display data during a single regeneration cycle for the video frame. A random access memory address generator maintains segregated storage for the odd and even scan line data and can accommodate storage for the status bytes indicating scan line omission. Storage data can be read out of the random access memory under microprocessor control and rearranged in the form desired for presentation by print buffer and print mechanism. The digital storage apparatus is also able to accommodate varying numbers of scan lines per frame and varying numbers of bit positions per scan line as found in different models of video display terminals.

The foregoing and other objects, features and advantages of the invention will be apparent from the following more particular description of a preferred embodiment of the invention as illustrated in the accompanying drawing.

DESCRIPTION OF THE PREFERRED EMBODIMENT

Figure 1:
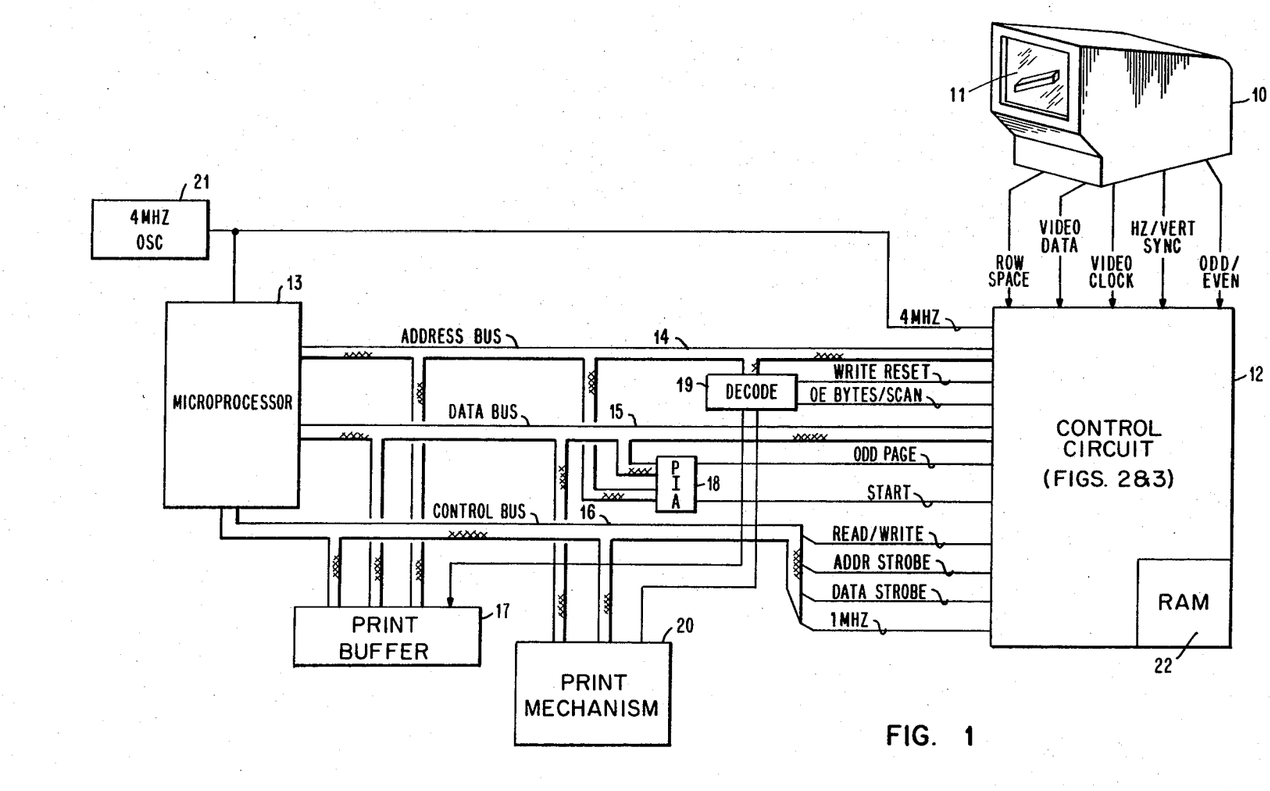
FIG. 1 is a schematic diagram illustrating the interrelationship of major elements of apparatus for capturing and recording binary data from a video display terminal.

Referring to the general organizational diagram in FIG. 1, there is shown a conventional cathode ray tube display terminal 10 having on its face 11 exhibited a frame of data that is desired to be recorded. The data frame is comprised of a plurality of horizontal scan lines, typically totaling 525 lines. As the electron beam is scanned across the tube face, the beam is either blanked or unblanked at each dot location for each corresponding increment of travel. The number of dot locations or data bit positions in a scan line varies with the design of the display device but typically numbers about 800. When the beam is unblanked, a phosphorescent dot approximately 0.25 mm in diameter is visible on the tube face, and a display of characters or figures is composed of a plurality of dots appearing at predetermined locations. A data frame is composed of interlaced scan lines, that is, even lines 0, 2, 4, etc. and odd lines of 1, 3, 5 etc. are alternately generated. Since the persistence of the phosphorescence is of short duration, a displayed frame of data is repeatedly regenerated and usually occurs 60 times per second.

When a printed copy of a data frame is required, a regeneration data is taken from the display device and placed in storage for subsequent use by a slower speed matrix printer. The video display data and supplemental signals of a row space signal, a video clock, a horizontal and vertical sync signal and a signal representing odd or even lines of a frame regeneration are supplied from the display device to control circuit 12 which is also connected to a microprocessor 13 through address bus 14, data bus 15 and control bus 16. The address bus is further connected to a print buffer 17 for assembling a line of print data, and to a peripheral interface adapter (PIA) 18 which will provide an "odd page" signal for memory control in circuit 12 and a start signal. The address bus is further connected to a decode circuit 19 which provides write reset signals and odd/even bytes per scan signals to control circuit 12 and also other control signals to print buffer 17 and print mechanism 20. Data bus 15 is also connected with print buffer 17, print mechanism 20 and PIA 18. Control bus 16 interconnects with print buffer 17 and print mechanism 20 and provides to control circuit 12 read/write signals, address strobe signals, data strobe signals and oscillator signals. Another oscillator 21 provides signals at a 4 MHz frequency to both microprocessor 13 and control circuit 12. Control circuit 12 is under the direction of the microprocessor and includes a memory portion indicated as a random access memory (RAM) 22 for storing the bit data from the video display device 10.

The invention is contemplated for use with a matrix printer in which the print head has a plurality of marking elements and moves transversely of the recording medium. The video data are intended to be read out from the random access memory such that one marking element records one scan line of data. As the print head moves across the recording medium a plurality of scan lines will be simultaneously recorded.

The capturing of video data will be described generally first and then in more detail with relation to FIGS. 2a, 2b, 3a-3d, 4 and 5. When the print button is depressed, the microprocessor is alerted to wait for an even to odd transition on the odd/even line. This is sensed in a status register not shown here. When the even to odd transition occurs, the microprocessor provides a write reset signal and makes a start signal valid. This timing relation is shown in FIGS. 4a-4e. The microprocessor then counts the number of horizontal synchronizing signals while the circuit is capturing the video data. Sync signal counting continues until another even to odd transition occurs on the odd/even line and at that time the start signal is invalidated stopping the capture operation. At this point, all information is stored in the RAM. There are two "pages" in RAM, an odd page and an even page. During the capture sequence, the odd/even signal directs the flow of data according to a signal level so that the odd frame information fills the odd page starting with address 0000 and likewise the even frame information fill the even page, distinguished by a high order bit, starting at address 0000. During capture, 16 bits of information in a scan line is deserialized in a shift register and transferred as two bytes in parallel to latches. While these two bytes of data are being stored in succession in the RAM, a second sequence of 16 bits is being deserialized. At each line end a status byte is also stored to indicate whether the following four scan lines are blank to provide a space between displayed data lines. Capture of information continues for each scan line in this manner until the next even to odd transition level is sensed, indicating that both the odd and even frames have been generated once.

Figure 2A:
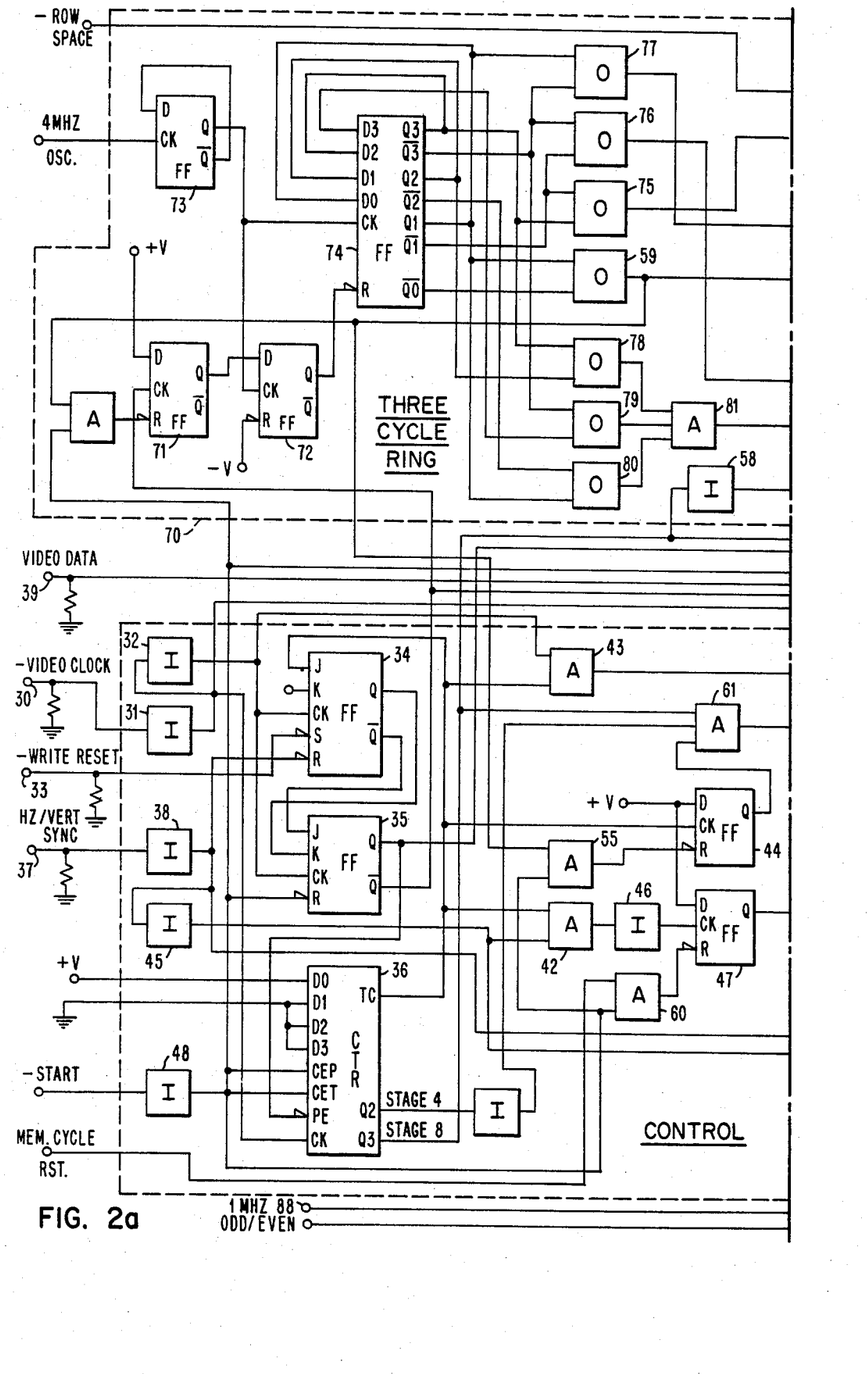
FIGS. 2a and 2b are a schematic diagram of a circuit for capturing scan line segments and status bytes in preparation for storage in a random access memory.
Figure 2B:
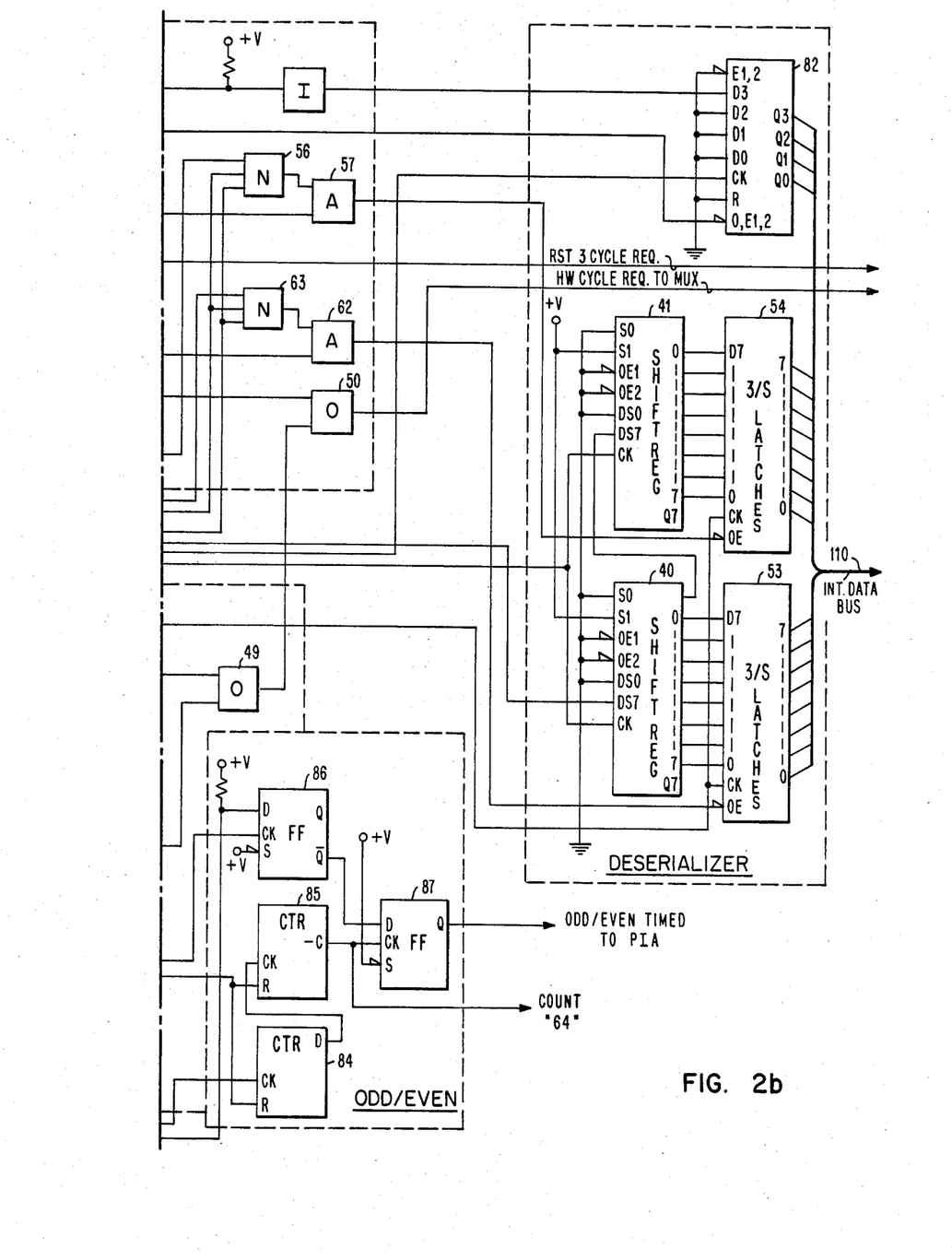
Figure 5:
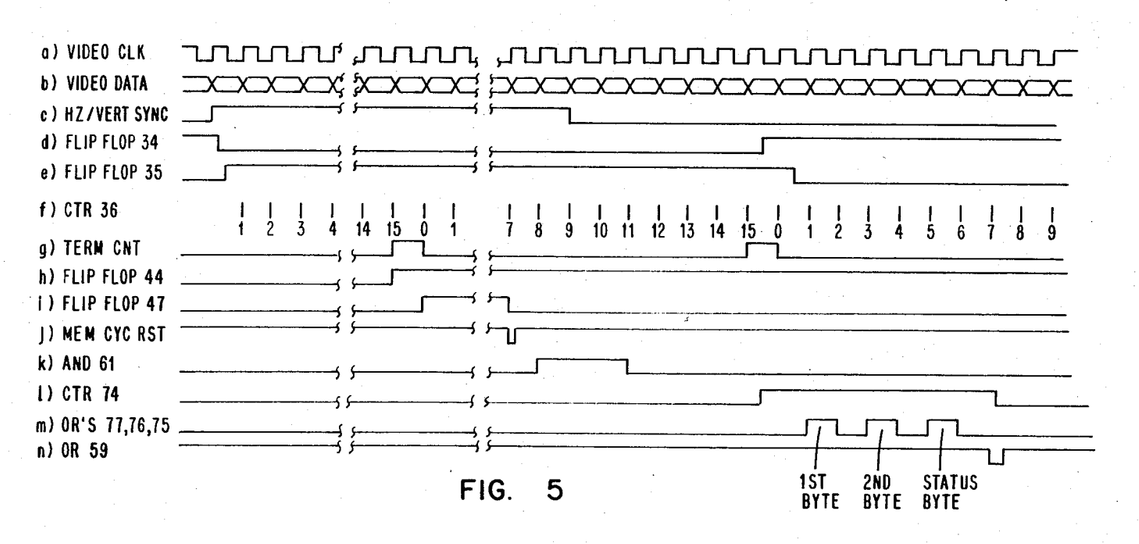

Reference is now made to FIGS. 2a, 2b and FIG. 5 which show the data capture circuit in more detail and the timing relationships. A video clock signal is continuously present at terminal 30 (FIG. 5a) and is inverted at 31 and again at 32 so that both positive and complementary clock signals are available from one of these two inverters. It will be recalled that the microprocessor provides a write reset which appears at terminal 33; this signal sets flip flop 34 to a one which serves as a conditioning input to flip flop 35. With the next clock signal, flip flop 35 is turned off which in turn holds 4-bit binary counter 36 set to a decimal 1. This is a steady state condition until the vertical synchronizing signal concludes at terminal 37 (FIG. 5c). The change to a positive signal level at terminal 37 through inverter 38 resets flip flop 34 (FIG. 5d) so that a succeeding clock pulse sets flip flop 35 to a 1 (FIG. 5e) and counter 36 begins to count in response to video clock pulses. (FIG. 5f)

At the beginning of a scan line, which occurs at the conclusion of the vertical sync, video data appearing at terminal 39 is transmitted to an 8 bit shift register 40 in series with a second 8 bit shift register 41. The data are entered into the shift register under the timing of video clock pulses.

When counter 36 reaches a full count indicating 16 bits of a scan line have been read into the shift register 40, 41, the counter provides an output signal TC which appears at ANDs 42 and 43 and at flip flops 34 and 44. (FIGS. 5g and 5h) AND 42 is already conditioned by the horizontal sync level from inverter 45 so that the change to an inverted level from 46 turns on flip flop 47. (FIG. 5i) This signal through ORs 49 and 50 generates an HW cycle request to multiplexer 51 (FIG. 3c) for executing a storage cycle in RAM 22 in FIG. 3d.

Referring again to FIGS. 2a and 2b, data are transferred from shift registers 40 and 41 to respective three state latches 53 and 54 under control of a clock signal from AND 43 that provides an output in response to the TC and video clock signals. A TC signal at flip flop 44 is effective to turn the flip flop on since both inputs to AND 55 from inverter 48 and OR 59 are on. The TC signal at flip flop 34 is ineffective since the flip flop is held reset by the signal from inverter 38.

At the time of data transfer from the shift registers 40 and 41, three-state latches 54 are the first to transfer their data to the internal data bus. This is the first 8 bits or 1 byte for storage to RAM. Latches 54 are enabled for the transfer by a low output of AND 57. This is low output occurred when stage 8 of counter 36 went off at the conclusion of the TC signal at counter 36. The change in stage 8 was inverted at 58 so that NAND 56 produces a low output to AND 57. Latch 47 is reset by a memory reset signal through AND 60 from FIG. 3b. (FIG. 5j)

Video clock pulses continue advancing counter 36 and the shift registers 40 and 41 for the second 16 bits or bytes 3 and 4 of data on the first scan line. There remains, however, the second byte still in three-state latches 53 for transmittal to RAM. When counter 36 reaches a count of 8, it is effective through AND 61, conditioned by an inverted input from stage 4 of counter 36 and the Q output from latch 44, to signal another HW cycle request to multiplexer through ORs 49 and 50 to store byte 2. (FIG. 5k) Byte 2 of data is transmitted on the internal data bus to RAM since latches 53 are enabled by a signal from AND 62. AND 62 is blocked by NAND 63 when stage 8 of counter 36 is on for counts of 8, 9, 10 and 11 at the counter. Latch 44 serves to prevent a RAM storage cycle during the capture of the first eight bits of each scan line.

The capture of scan line data 16 bits at a time and their storage in memory as two succesive bytes of data continues for the duration of the scan line. However, the occurrence of a horizontal sync signal, indicating the termination of that scan line, produces a change in signal level from inverter 38 removing the reset from flip flop 34. If counter 36 is not at the full count of TC, it will continue to advance from the video clock, thus filling any scan line with blank data at the shift register until a full 16 bits have been completed and a TC signal occurs. When the TC signal occurs, it conditions flip flop 34 so that the next video clock signal turns on the flip flop and conditions flip flop 35 to be turned off.

There are now two bytes of scan line data and one status byte to be stored so that three storage cycles are necessary. The off output from flip flop 35 blocks counter 36 and clocks already conditioned flip flop 71 to an on state in three cycle ring circuit 70. With flip flop 71 on, flip flop 72 is conditioned to be clocked on by a pulse from frequency divider flip flop 73. When flip flop 72 turns on, four stage ring counter 74 can be advanced with the pulses from flip flop 73. (FIG. 5l) The advancement of ring counter 74 through its stages produces timed outputs from connected OR circuits 77 and 76 to produce two output enable signals successively from respective ANDs 57 and 62 which gate their three state latches 54, 53 onto the internal data bus to the RAM. OR circuits 78-80 having inputs connected to ring counter 74 and outputs connected to AND 81 provide the necessary series of HW cycle requests to multiplexer.

A status byte is used for indicating whether the next four scan lines are to be skipped as row space between displayed lines on the video display unit. The occurrence of a row space signal occurs at the end of a scan line, if present, and is stored in the next successive storage address by the action of flip flop 35. It is stored by the operate enable from OR 75 and an HW cycle request signal from AND 81 through OR 50.

The capture of a new scan line of data is initiated in succession with the termination of each horizontal sync signal as described for the first scan line. After the last scan line has been captured in the odd field, in the present example, a vertical sync signal is generated by the video display device.

To assure that the vertical sync is recognized because of the variations in VDT models or designs, a logical sensing circuit is provided in FIGS. 2a and 2b by a pair of four bit, series-connected counters 84, 85 and a pair of flip flops 86, 87. A on MHz signal is supplied at terminal 88 to the clock input of counter 84. However, the counters are held reset until the occurrence of either a horizontal or vertical sync at terminal 37. A sync signal from inverter 38 is able to turn on flip flop 86 whose output conditions flip flop 87. The sync signal also removes the reset from counters 84, 85 via inverter 45 so that the oscillator advances the counters. If the sync signal is present for a sufficient time, indicating a vertical sync, then counter 85 will count to 64 and provide an output. This will turn on flip flop 87 and generate an odd/even timed signal at the PIA of FIG. 1. If the sync signal is of short duration because it is a horizontal sync, then its termination will reset counters 84, 85 and reset flip flop 86.

At the conclusion of the odd field data capture, the vertical sync signal occurs and the odd/even line level changes. The vertical sync signal permits the generation of a "count 64" signal to reset the address generator (FIG. 3b) to zero except for the high order position which is changed to the opposite level by the change in odd/even line level. Thus, the even page of RAM is selected for storage of bit position data from the even scan lines.

Storage of the captured data bytes occurs with the circuit of FIGS. 3a-3d. The HW cycle requests generated at FIG. 2b are translated by multiplexer 51, selected by the microprocessor start signal, into a memory cycle request that appears as a clock for conditioned flip flop 90 at FIG. 3a whose Q output is effective through OR 91 to condition flip flop 92. A free running oscillator 93 has its output connected to conditioned NAND 94 whose output is effective to set flip flop 92 on. This removes the reset at ring counter 94 allowing it to step through the connected logic.

Figure 3A:
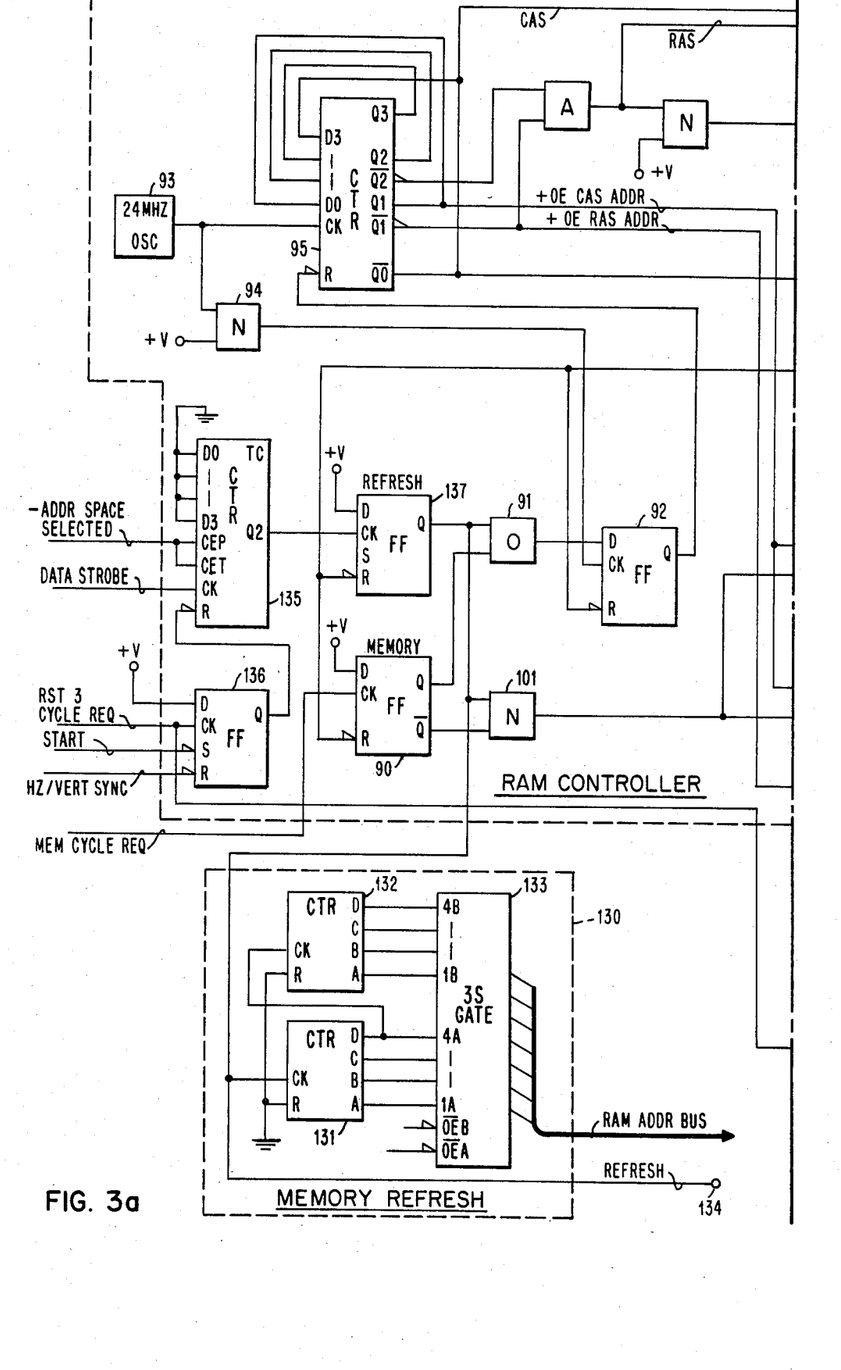
FIGS. 3a, 3b, 3c and 3d are schematic diagrams of the circuits for controlling the storage, refreshing and retrieval of the video data captured by the circuit shown in FIGS. 2a and 2b.
Figure 3B:
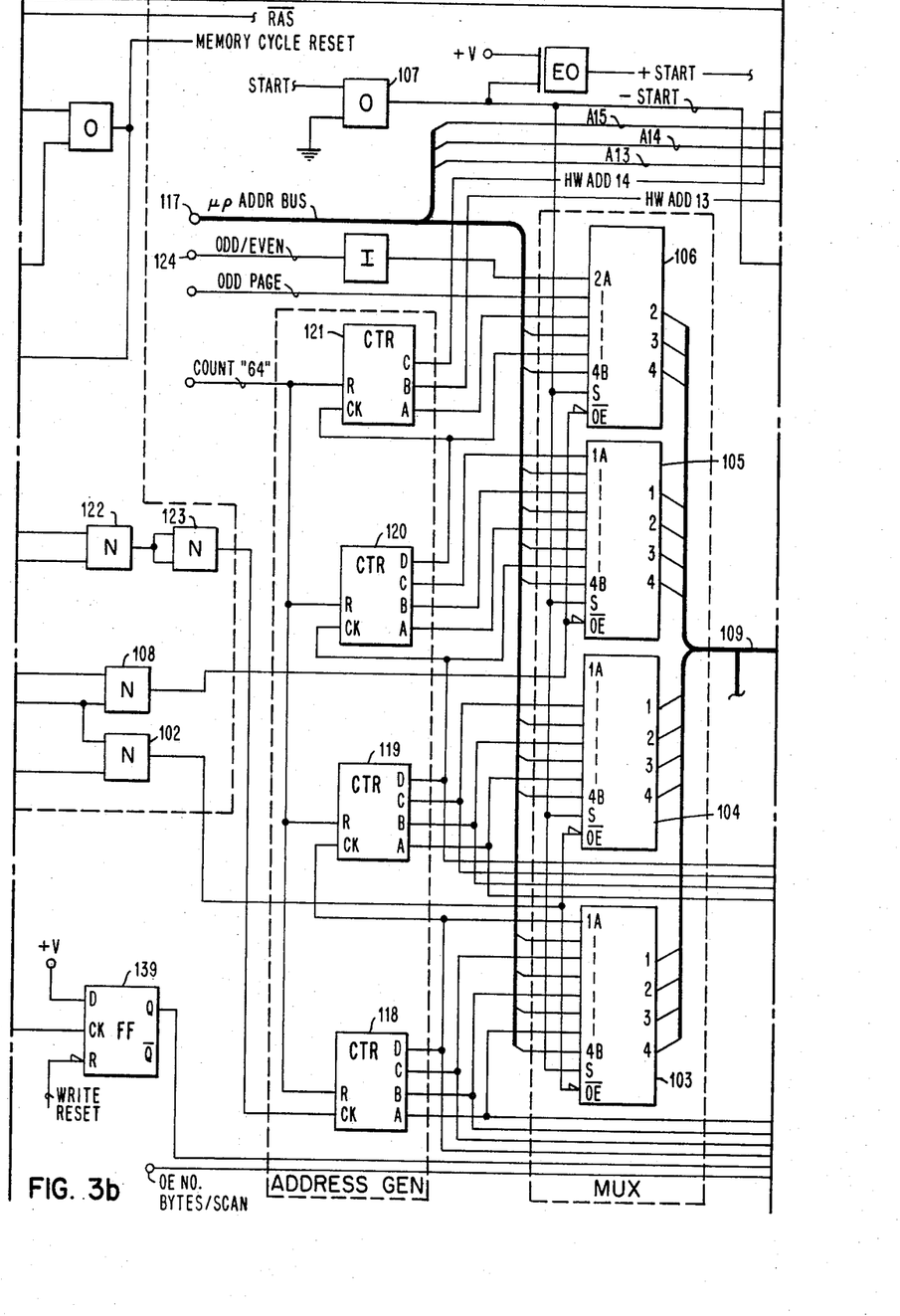

A row address strobe (RAS) output from counter 95 and an output from NAND 101 combine at NAND 102 to produce an operable enable signal at multiplexers 103 and 104 in FIG. 3b. The multiplexers 103-106 have been set for the storage of data from the display device via the start signal from OR 107 and remain on during data capture. Subsequent to the RAS signal, there occurs a column address strobe (CAS) from counter 95 in FIG. 3a which is also combined with the output from NAND 101 but at NAND 108 in FIG. 3b whose output enables multiplexers 105 and 106. The multiplexer enabling signals place a selected address on the RAM address bus 109 in FIG. 3c to store the data already present on internal data bus 110.

Figure 3C:
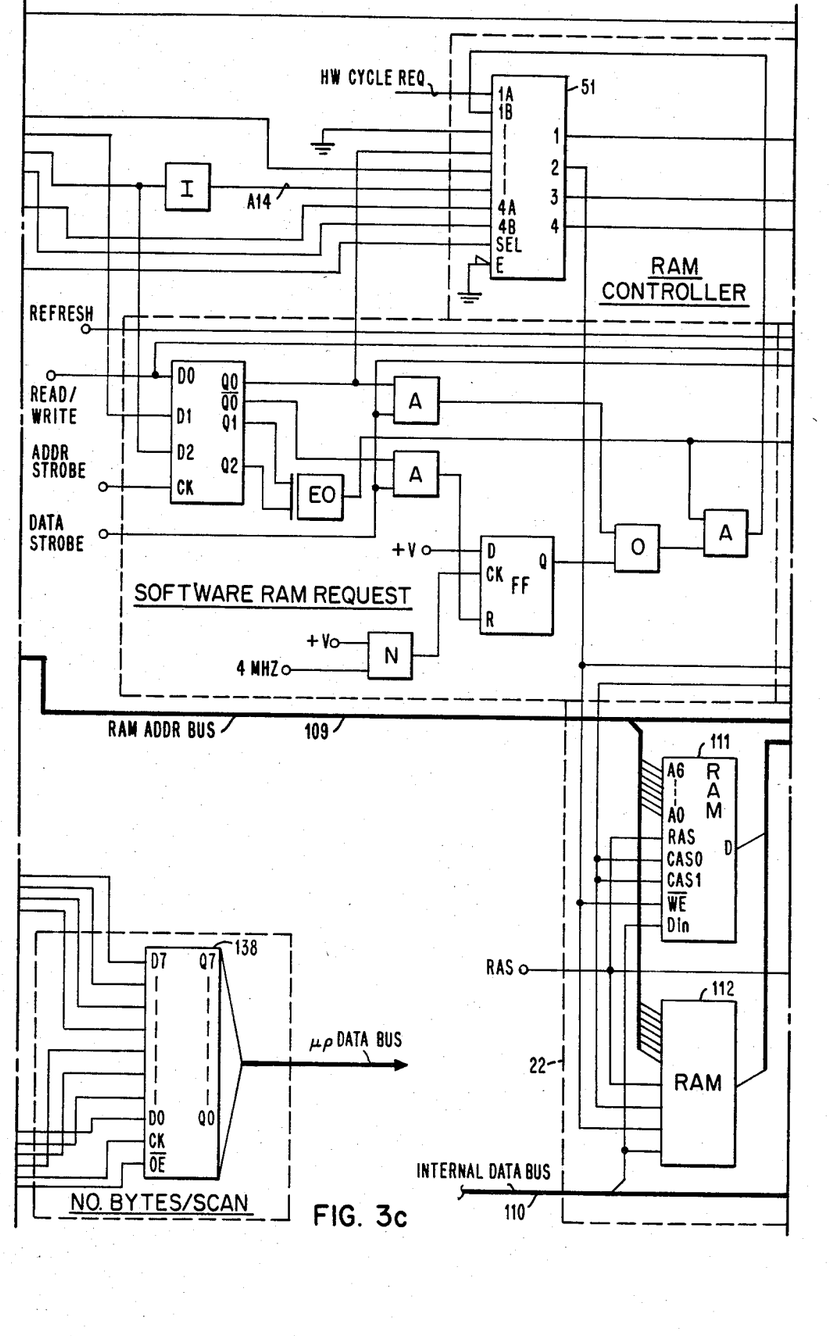
Figure 3D:
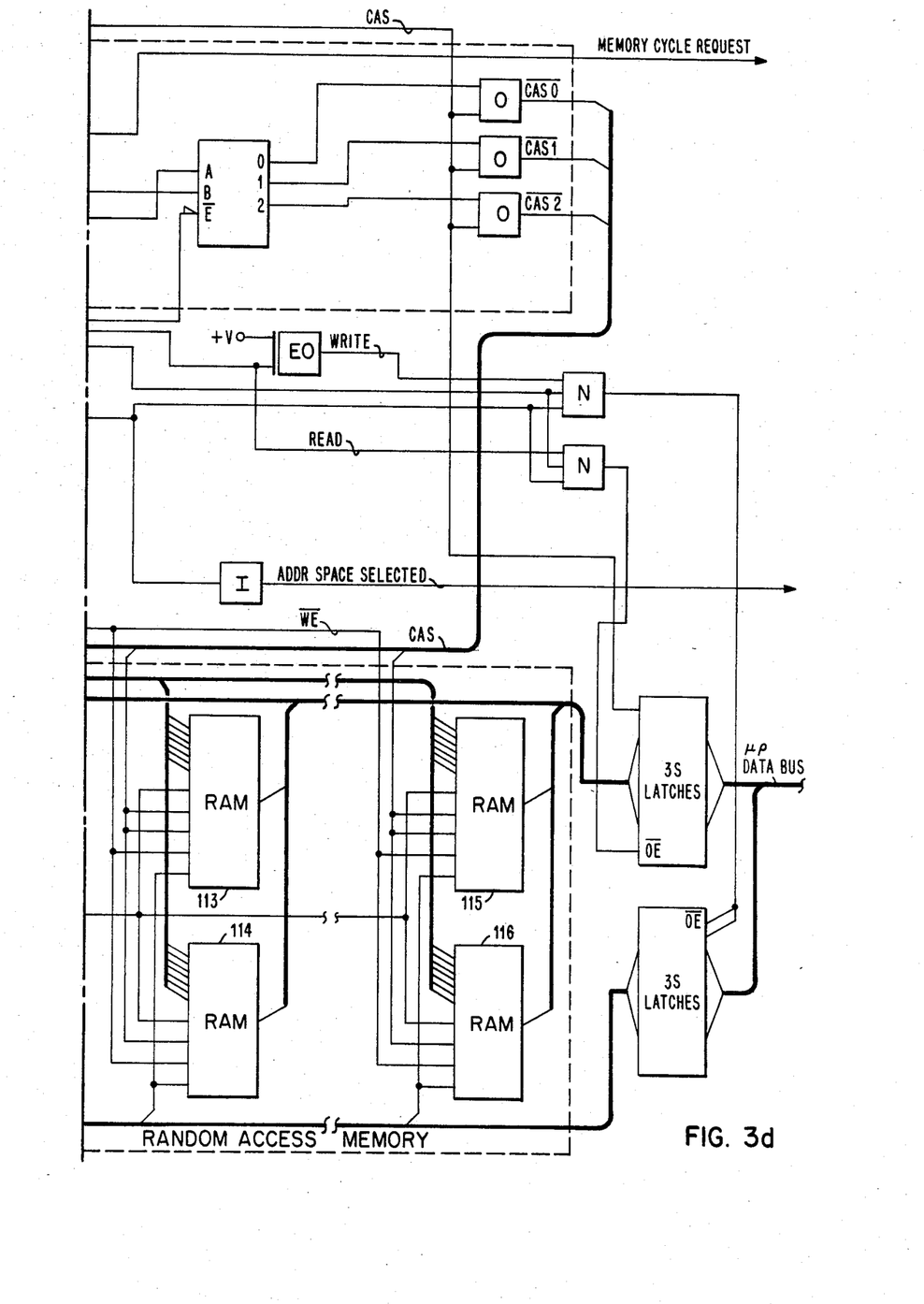
Figure 4:
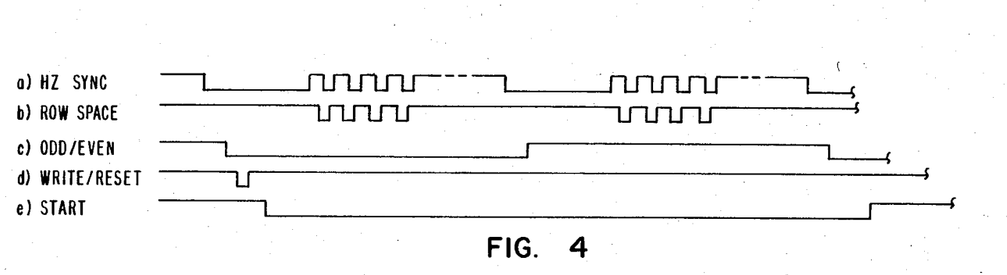
FIGS. 4 and 5 are timing diagrams for the circuits of FIGS. 2a-2b and FIGS. 3a-3d, respectively.

The RAM 22 is a plurality of 16K×1 and 32K×1 bit memory chips 111–116 in parallel and addressable from the RAM address bus 109 from either the counters 118–121 or from microprocessor address bus 117 in FIG. 3b, depending upon which unit is currently controlling the RAM. During the storage of captured video data, the RAM address is generated by cascaded 4-bit counters 118–121. Counters 118 and 119 supply row addresses to the multiplexers 103 and 104 while counters 120 and 121 supply column addresses to multiplexers 105 and 106. The counters are advanced one count by the absence of a refresh pulse and a CAS signal through NANDs 122 and 123. An incrementing signal thus occurs with each memory cycle request when no memory refresh is occurring. It will be noted that counters 118–121 are reset during the occurrence of a vertical sync signal. The odd and even page addresses are determined by the 0 or 1 bit at multiplexer 106 in the high order position for the address generator output according to the level of the input odd/even signal at terminal 124.

RAM 22 is refreshed through the control of circuit 130 in FIG. 3a. This circuit comprises two 4-bit counters 131, 132 connected in series and having outputs connected to respective inputs of three-state gate 133 that, in turn, has its outputs connected to the RAM address bus. The signal levels serve as an address to identify the next row, as a row address that is to be refreshed by the signal row address strobe (RAS). Counters 131, 132 are clocked by counter 135 and flip flops 136 and 137. Counter 135 is held reset when flip flop 136 is off. However, when flip flop 136 is turned on, counter 135 can be advanced by data strobe pulses from the microprocessor. As the counter is advanced, its stage 2 output clocks flip flop 137 on which then serves to clock counter 131 and advance the row address by 1. When flip flop 137 turns on, it is effective through OR 91 and flip flop 92 to release counter 95 which cycles once and produces a RAS refresh signal.

Referring to FIG. 3b, the outputs from row address 118 and 119 serve as inputs at eight stage-three state latch 138 in FIG. 3c. This latch, however, is blocked until clocked by the output from flip flop 139. (FIG. 3b) At the occurrence of a RST 3 cycle request at flip flop 139 the Q output clocks the current row address count for the first scan line from counters 118 and 119 for transmission on the microprocessor data bus. The number of data bit positions per scan line can, of course, be calculated from the number of scan line bytes.

Although the manner in which data are retrieved from RAM does not form a part of this invention, a brief description is given to permit a more complete understanding of the process. Retrieval of the data is done under control of the microprocessor and must be rearranged for recording by a serial printer. In the present instance, it is contemplated that the data will be recorded by a printer having two spaced vertical rows of electrodes with the electrodes in one vertical row offset vertically with respect to the other to enable recording in the space between electrodes in the same vertical row. Thus, if each vertical row has eight electrodes, then 16 bits can be printed at each print position or during traversal of the print head transversely of the paper, the data from 16 horizontal scan lines of the video frame can be printed during a single pass of the print head.

The data to be printed are assembled in a print buffer which is large enough to contain all data required for the 16 scan lines. If the print wires are pictured as containing two bits of data with the top most electrodes as recording the most significant bits, information from particular scans can be "anded" into these bytes for printing. Two buffer addresses are required for each print position, one for odd print electrodes and one for the even print electrodes. The print buffer is initialized to all one's before data capture. A bit set to 0 causes a dot to be printed for that print position. The algorithm for the microprocessor reads two bytes of data from the odd data page and two bytes of data from the even data page. Consider these bytes as scan line 1 and scan line 2 data from the upper left corner of the display. Each bit is examined for a 0 state. If a 0 state is found, the appropriate mask (mask 7 in this case) is "anded" into the correct print buffer position. Mask selection is determined by the scan being examined, that is, scans 1 and 2 use mask 7, scans 3 and 4 use mask 6 etc. Sixteen scans of eight odd and eight even scan lines are examined for each print line. Buffer data is examined horizontally across the screen for each scan pair until a complete print line is restructured in the print buffer. The print line is full when the last mask has been used.

The insertion of status byte for row skip is accomplished by incrementing the mask pointer by two when the row skip flag is detected in the status byte captured at the end of each scan. Incrementing the mask pointer by two causes four bit positions (two odd and two even) to be left as one's in the print buffer and simulates the vertical spacing of data required in printing.

It will be seen from the foregoing that the invention provides apparatus for capturing data from all addressable points in a display frame from a video display terminal. Further, these data are captured in a single regeneration cycle of the display thus freeing the display for other use while the captured data are printed out at a slower rate. The apparatus is further able to accommodate row skips indicated by status bytes at the end of each scan line, which are frequently encountered in displayed data.

While the invention has been described in terms of the preferred embodiment thereof, it will be readily apparent to those skilled in the art that other modifications and variations may be made therein without departing from the spirit and scope of the invention. It is therefore intended that the invention not be limited to the specifics of the foregoing description of the preferred embodiment, but rather is to embrace the full scope of the following claims.

What is claimed is:

1. Apparatus for storing video data displayed as a group of scan lines of bit positions generated in response to scan line synchronizing signals and in conjunction with video clock signals comprising:

memory means having data storage locations each for receiving bit position data for said scan line;

means responsive to a said synchronizing signal for temporarily recording the bit position data from a said scan line; and control means responsive to the accumulation of a predetermined number of said recorded bit position data for storing said recorded data in selected ones of said storage locations of said memory means during the recording of succeeding bit position data in said scan line.

2. Apparatus as described in claim 1 wherein said storage locations in said memory means are addressable and said apparatus further includes means for selectively addressing said storage locations.

3. Apparatus as described in claim 1 wherein said control means includes means for counting a predetermined number of recorded bit positions and is operable at both partial and full counts of said counting means to effect the storing of said bit position data.

4. Apparatus as described in claim 1 wherein said scan line bit position data include status data bit positions and said control means effects the storage of said status data for said scan lines.

5. Apparatus as described in claim 4 wherein said status data bit positions occur at the end of a said scan line.

6. Apparatus as described in claim 1 wherein said control means includes means for generating supplemental signals at the end of each said scan line to successively select a predetermined number of said storage locations in said memory means for said recorded bit position data.

7. Apparatus for storing a selected frame of video data displayed as successive groups of scan lines of bit position data generated in response to synchronizing signals in conjunction with video clock signals comprising:

memory means having a plurality of storage locations for bit position data;

means responsive to a first synchronizing signal at the beginning of one of said groups of scan lines for recording said bit position data in succession for all said scan lines in said first group and responsive to a second synchronizing signal for recording the bit position data in succession for all said scan lines in said second group;

means for addressing successive ones of said storage locations in said memory means for storing the bit position data of each said group; and control means responsive to the recording of data from predetermined numbers of said bit positions for activating said address means to store a plurality of said recorded bits in a said storage location in said memory means.

8. Apparatus as described in claim 7 wherein said control means includes means for counting a predetermined number of recorded bit positions and is operable at both partial and full counts to effect the storing of said bit position data therefor.

9. Apparatus as described in claim 7 wherein each said scan line bit position data include status data bit positions and said control means effects the storage of said status data for each said scan line in each said group.

10. Apparatus as described in claim 7 wherein said control means includes means for generating supplemental signals to activate said address means at the end of each said scan line to store a predetermined number of recorded bit positions in said storage locations in said memory means.

11. Apparatus as described in claim 7 further including means for initiating the storing of said second group of scan lines a predetermined time after the start of said second synchronizing signal.

12. Apparatus as described in claim 7 wherein said second synchronizing signal is the next succeeding synchronizing signal following said first synchronizing signal.

13. Apparatus as described in claim 7 wherein said synchronizing signals are two successive vertical synchronizing signals in said frame of video data.

14. Apparatus as described in claim 7 wherein said control means effects the storage of said plurality of recorded bits during the recording of a succeeding predetermined number of said bit positions.

15. Apparatus as described in claim 12 wherein said address means segregates the storage locations of bit position data recorded corresponding to said two synchronizing signals.

* * * * *